United States Patent [19]

Halmshaw

[11] 4,365,233
[45] Dec. 21, 1982

[54] DIRECTION INDICATOR SYSTEMS FOR VEHICLES

[75] Inventor: Raymond P. Halmshaw, Redditch, England

[73] Assignee: Lucas Industries Limited, Birmingham, England

[21] Appl. No.: 255,938

[22] Filed: Apr. 20, 1981

[51] Int. Cl.³ .............................................. B60Q 1/34
[52] U.S. Cl. ...................................... 340/73; 340/641
[58] Field of Search ........................ 340/73, 81 R, 641

[56] References Cited

U.S. PATENT DOCUMENTS 4,236,143 11/1980 Mizuno .................................. 340/73
4,266,212 5/1981 Mizuno .............................. 340/81 R Primary Examiner—Donald J. Yusko
Attorney, Agent, or Firm—Ladas & Parry

[57] ABSTRACT

A direction indicator system for a road vehicle includes a selector switch operable to select the operation of one or the other set of direction indicator lamps of the vehicle, the selector switch being connected in series with a pair of relay contacts. An oscillator is provided for driving the relay the oscillator including a capacitor having a charge/discharge circuit and switch means having a control input. A reference voltage source is provided including switch means also having a control input. The system includes a comparator for comparing the capacitor voltage and reference voltage the comparator providing a signal to control the relay when the voltages are substantially equal.

11 Claims, 4 Drawing Figures

DIRECTION INDICATOR SYSTEMS FOR VEHICLES

This invention relates to a road vehicle direction indicator system the system comprising a selector switch operable to select the operation of one or the other set of direction indicator lamps of the vehicle unit, the selector switch being connected in series with a pair of contacts of an electro-magnetic relay whereby when the pair of contacts is closed electric current will be supplied to the selected set of lamps, and an oscillator for driving said relay.

The object of the invention is to provide a direction indicator system of the kind specified in a simple and convenient form.

According to the invention said oscillator comprises a capacitor, a charge/discharge circuit for the capacitor, first switch means for controlling the charge/discharge circuit, a control input for said first switch means, a reference voltage source, second switch means for varying the reference voltage, a control input for said second switch means, a comparator for comparing the capacitor voltage and the reference voltage, said comparator providing a signal to control the energisation of said relay when the voltages at the inputs of the comparator become substantially equal, said control inputs being electrically connected to said relay contacts so that the operation of the charge/discharge circuit of the capacitor and the output of the reference voltage are altered only when said relay contacts change their state.

One example of a direction indicator system in accordance with the invention will now be described with reference to the accompanying drawings in which.

The system to be described is for a direction indicator system which employs three lamps in each set of direction indicator lamps. A first pilot lamp is provided which is connected in parallel with the selected set of indicator lamps and a second pilot lamp is provided. The first pilot lamp operates at the same time as the lamps of the selected set and the second pilot lamp operates substantially in synchronism with the first lamp. When one lamp of a selected set has failed or is disconnected, it is arranged that the second pilot lamp remains extinguished but the first pilot lamp together with the good lamps of the selected set continue to operate at the normal frequency. If a further lamp should fail then the first pilot lamp continues to operate along with the remaining lamp but the frequency of operation is increased.

Figure 1:
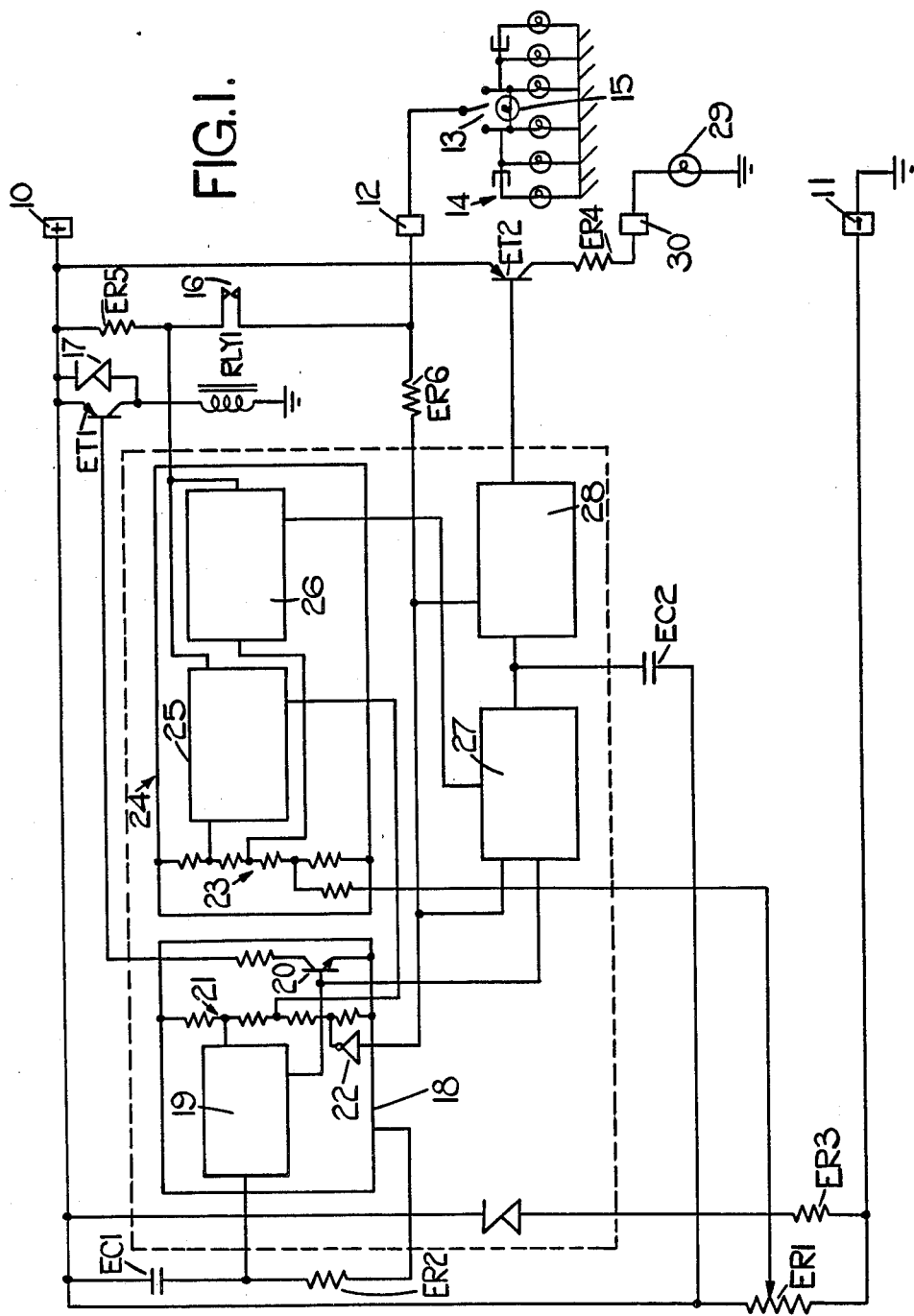
FIG. 1 shows a block circuit diagram of the system.

Referring to FIG. 1 of the drawings there are provided terminals 10 and 11 for connection to the positive and negative terminals of a source of supply conveniently the storage battery of the vehicle unit. In addition there is provided a terminal 12 which is connected to the wiper contact of a direction indicator switch 13 which has an intermediate position and a pair of selecting positions, at which are a pair of fixed contacts respectively, in which the lamps on the appropriate side of the vehicle unit will be illuminated. The two sets of lamps are indicated at 14 each set comprising three lamps connected in parallel. The sets are the lamps of each set being connected to the fixed switch contacts respectively. The other terminals of the lamps are connected to terminal 11 by way of the earthing system of the vehicle. Moreover, a first pilot lamp 15 is connected across the fixed contacts of the switch 13 so that it will be illuminated when flow of current occurs to either one of the sets of lamps.

Terminal 12 is connected by way of a pair of normally open relay contacts 16 and a resistor ER5 in series, to terminal 10. The contacts 16 are operated by means of a relay coil RLY1 one end of which is connected to terminal 11 and the other end of which is connected to terminal 10 by way of the collector emitter path of a p-n-p transistor ET1. A zener diode 17 is connected between the emitter and collector terminals of the transistor.

Also provided is an oscillator 18 which is shown in block form and this includes a comparator 19 having an output connected to the base of an n-p-n transistor 20. The collector of this transistor is connected to the base of transistor ET1 by way of a resistor. The oscillator also includes a reference voltage source comprising a resistor chain 21, a tapping of which is connected to a reference voltage input terminal of the comparator 19 and a further tapping is connected by way of an inverter 22, to one end of a resistor ER6 the other end of which is connected to terminal 12.

The other input terminal of the comparator 19 is connected to the junction of a capacitor EC1 and a resistor ER2 the other end of which is connected back into the oscillator circuit and the other plate of the capacitor is connected to terminal 10.

Connected between terminals 10 and 11 is the resistance element of a potentiometer ER1 and the slider of this potentiometer is connected by way of a resistor to a tapping in a resistance chain 23 forming part of a lamp failure detector 24. The lamp failure detector comprises a pair of comparators 25, 26 each of which has a reference input terminal connected to different tappings in the resistance chain 23. Moreover, each comparator 25, 26 has an input terminal which is connected to a point intermediate the resistor ER5 and the pair of relay contacts 16.

The output of comparator 25 is connected to a point in the resistance chain 21 of the oscillator 18 and the output of the comparator 26 is connected to an input terminal of a logic network 27. The logic network 27 has a pair of gate inputs one of the inputs being connected to the base of transistor 20 whilst the other input is connected to a point intermediate the resistor ER6 and the inverter 22. The output of the logic circuit is connected to the input of a switch 28 the output of which is connected to the base of a p-n-p transistor ET2 the collector emitter path of which is connected in series between terminals 10 and 11, with a resistor ER4 and the second pilot lamp 29. For convenience a terminal 30 is provided to which the pilot lamp 29 is connected. Moreover, the switch 28 has a gate input which is connected to a point intermediate the inverter 22 and the resistor ER6.

In the practical circuit the resistor chains 21 and 23 are connected across a stabilised supply and the various components of the comparators 19, 25 and 26 are supplied with current from this same supply. When the switch 13 is moved to one of its alternative positions, closure of the relay contacts 16 will cause the selected set of direction indicator lamps to be illuminated. At the same time the pilot lamp 15 will be illuminated.

Figure 2:
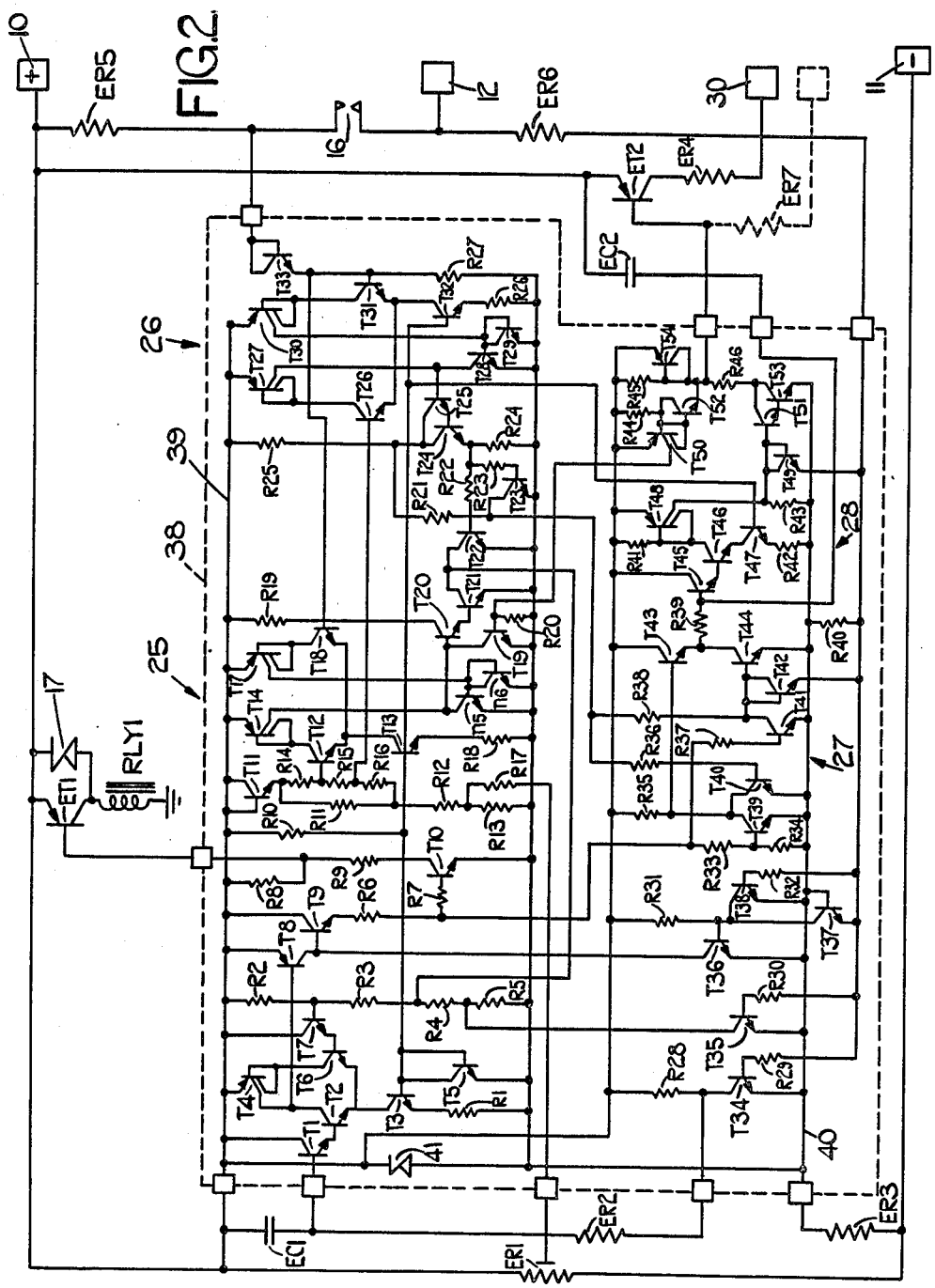
FIG. 2 shows a complete circuit diagram of the system.
Figure 4:
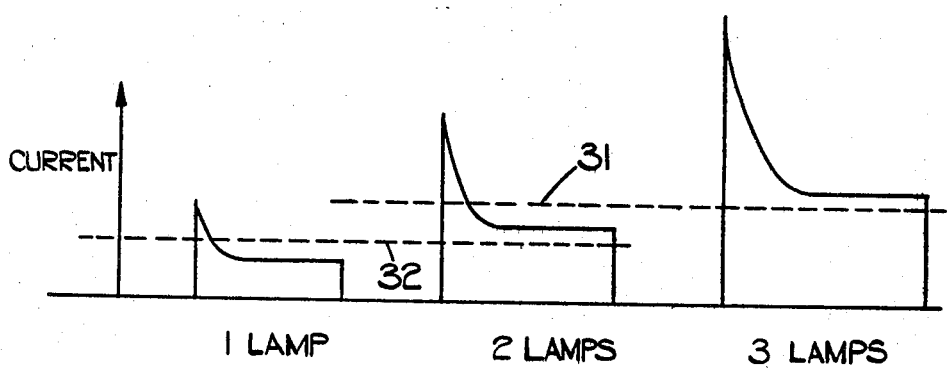
FIG. 4 shows voltage levels across the current sensing resistor.

Turning to FIG. 4, this shows the current flowing in the resistor ER5 during the time the contacts 16 are closed. Three curves are illustrated, the right hand curve showing the current flow obtained when three lamps are in operation, the centre curve showing the current flow when two lamps are in operation and the left hand curve showing the current flow when one lamp is in operation. It will be seen that the peak value of current when two lamps only are in operation exceeds the steady level of current flow when three lamps are in operation and similarly the peak level of current flow when one lamp only is in operation exceeds the steady current flow when two lamps are in operation. As has been stated it is desired to provide an indication to the operator when firstly one lamp has failed or been disconnected and also when a further lamp has failed. This is achieved by sensing at two levels. The upper level which is referenced 31 in FIG. 4 is sensed by comparator 26 and the lower level referenced 32 is sensed by comparator 25. Ignoring the peaks of current, then providing the steady current exceeds the upper level 31 both comparators will provide an output. If one lamp should fail or be disconnected, only comparator 25 will provide an output and if a further lamp fails, comparator 25 will cease to provide an output. The requirement is that if the three lamps of the set are operating then the second pilot lamp 29 should operate substantially in synchronism with the main lamps and be permanently extinguished when one lamp fails or is disconnected. If two lamps fail or are out of circuit then it is a requirement that the frequency of operation of the remaining lamp together with that of the first pilot lamp 15 should increase. In order to achieve this the comparator 25 when it ceases to provide an output, modifies the operation of the oscillator to increase the frequency thereof. As will be seen the output of the comparator 25 is connected to a point in the resistance chain 21. In fact as will be apparent when the practical circuit of FIG. 2 is described, comparator 25 has an open collector transistor output which normally is saturated when the lower level 32 of current is exceeded.

Figure 3:
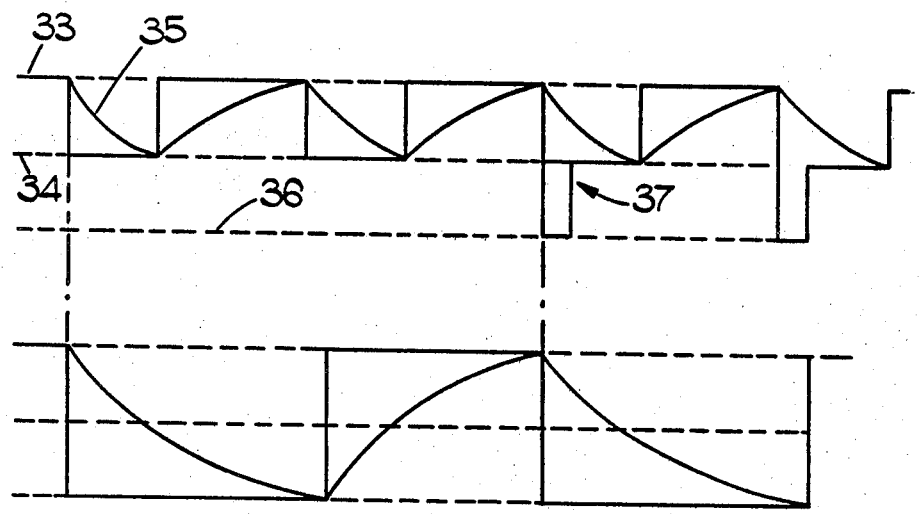
FIG. 3 shows voltage levels associated with the oscillator of the system.

Turning to FIG. 3 the left hand portion of the upper graph shows the operation of the oscillator with the comparator 25 disconnected. In this situation the voltage applied at the reference input of the comparator 19 moves between a high level referenced 33 and an intermediate level referenced 34. These two levels are defined by the resistance chain 21 depending upon the conducting state of the inverter 22 which forms a switch means responsive to the relay contacts. When the relay contacts are open the higher voltage level pertains and when the relay contacts are closed then the intermediate level pertains.

The capacitor EC1 can be charged through the resistor ER2 or discharged through this resistor depending upon the state of switch means which will be identified when the practical circuit is described. This switch means is also responsive to the relay contacts. The voltage on capacitor EC1 therefore moves between the higher and intermediate levels as indicated by the line 35 in FIG. 3. When the voltage across the capacitor attains the reference voltage then switching occurs. The right hand portion of the upper graph in FIG. 3 shows the situation when the comparator 25 is connected. As stated above the comparator 25 has an open collector transistor output which is saturated when the current flowing to the lamps exceeds the lower level 32 shown in FIG. 4 thus if the current in the lamps exceeds this level then the reference voltage will move to the lower level 36 shown in FIG. 3. This is because a substantial portion of the resistance chain 21 will be shorted. When one lamp only is illuminated the comparator senses the high current momentarily and the reference voltage temporarily falls to the low level 36; however, when the lamp current fails the comparator 25 no longer shorts out the portion of the resistor chain 21 and the reference level returns to the intermediate level 34. This is indicated at 37 in FIG. 3. Hence even though temporarily the reference voltage moves to a low level this takes place during the initial charge period of the capacitor. The oscillator therefore operates at a high rate and similarly the one lamp of the selected set of lamps together with the first pilot lamp are operated at the same rate. When the current flowing in the lamps exceeds the level 32 in FIG. 4 then the reference voltage applied to the oscillator switches between the high level 33 and the low level 36. This is indicated in the lower graph of FIG. 3. Thus the frequency of operation of the oscillator is reduced and the indicator lamps flash at the normal rate. It can be seen therefore that the output of comparator 25 holds the reference voltage in the low condition during the current surge and will continue to hold it in the low condition providing at least two lamps are operative. If however only one lamps is operating then the reference voltage returns to the intermediate level before the capacitor voltage attains this level and the frequency of operation of the oscillator is substantially doubled thereby providing an indication to the operator of the vehicle.

Considering now the operation of the comparator 26. Comparator 26 senses the upper level 31 in FIG. 4. The duty of the comparator is to initiate a signal to the operator of the vehicle if one of the indicator lamps should fail or be disconnected. The problem exists of course that the surge current when two lamps are in operation exceeds the upper level 31 and therefore if the comparator 26 were utilised to operate the second pilot lamp 29 directly, this pilot lamp would flash momentarily even when one of the indicator lamps had failed or become disconnected. The output of the comparator 26 is therefore passed to the logic unit 27 and the output of the logic unit is utilised to adjust the charge on the capacitor EC2 only when the surge of current has passed. For this purpose the logic unit is provided with two gate signals one of which is derived from the base of transistor 20 and the other of which is derived by way of the resistor ER6 from the contacts of the relay. It is arranged that the comparator 26 through the logic unit is only able to adjust the voltage on the memory capacitor in the interval between de-energisation of the relay coil and the actual opening of the relay contacts. Moreover, it is arranged that when three lamps are in operation the voltage across the capacitor EC2 is substantially zero but when the comparator 26 detects the disconnection or failure of one of the lamps the capacitor is charged. The voltage on the capacitor is utilised to control the conduction of transistor ET2 by way of the switch 28 and this switch is closed when the relay contacts are closed, the closing signal being obtained through resistor ER6. Thus when the capacitor is discharged and the switch 28 is closed, transistor ET2 will be rendered conductive and the second pilot lamp 29 will be illuminated substantially in synchronism with the pilot lamp 15 and the selected set of indicator lamps. If however the capacitor is charged then when the switch 28 is closed transistor ET2 is not rendered conductive so that the pilot lamp does not operate.

With reference to FIG. 2, the components of the comparators, logic unit and switch are defined by the integrated circuit 38 and connections are made to the integrated circuit by way of contacts in the conventional manner. The integrated circuit has a positive supply line 39 which is directly connected to terminal 10 and a negative supply line 40 which is connected to terminal 11 by way of resistor ER3. A zener diode 41 is connected between the supply lines 39 and 40 to establish a stabilised supply for the various components.

The comparator 19 is constituted by transistors T1, T2 T3, T4, T6 and T7, transistor T5 being connected as a diode. The resistor chain 21 is made up of resistors R2, R3, R4 and R5. The output from the comparator is taken from the collector of transistor T4 and it is applied to the base of transistor T8 which in turn controls the conduction of transistor T9, this in turn controlling the conduction of transistor T10 this latter transistor feeding the transistor ET1 connected in series with the relay winding RLY1.

In FIG. 1 reference was made to feedback. This is provided by switch means in the form of a transistor T34. When this transistor is in a conducting state, the capacitor EC1 is effectively connected in series between the supply lines 39 and 40 with resistor ER2. As a result the capacitor is charged. When the transistor is non-conductive the capacitor is discharged through resistors ER2 and R28 connected in series. The conduction of transistor T34 is determined by the state of the relay contacts. When the latter are closed, transistor T34 is in a conducting state so that the capacitor EC1 is being charged. As will be seen the base of transistor T34 is connected through resistor R29 and ER6 to a point intermediate the contacts 16 and the switch 13.

Transistor T35 constitutes the switch means which determines the reference voltage and has its collector emitter circuit connected in parallel with resistor R5. The base of transistor T35 is connected by way of resistors R30 and ER6 to a point intermediate the contacts 16 and the switch 13.

It is desirable to allow the relay contacts to close and so cause illumination of the indicator lamps as soon as the selector switch 13 is operated and furthermore, it is desirable that the relay should be held in the de-energised state despite the condition of the oscillator, during the period when the indicator lamps 14 are not required. This latter requirement is accomplished by way of transistor T36. When the selector switch 13 is moved to select one of the sets of indicator lamps, the potential at terminal 12 is either substantially equal to that of terminal 11 or substantially equal to that of terminal 10. When the direction indicator is not in use the contacts 16 are open as also is the switch 13 so that the potential of terminal 12 would float. This is avoided by providing the resistor R40 which is connected between supply line 40 and terminal 12 by way of resistor ER6. Under this condition both transistors T37 and T38 are off and so transistor T36 saturates thereby preventing current from flowing into the base of transistor T8. Transistor T34 is also off so that capacitor EC1 will be discharged. When the switch 13 is moved to one of its alternative positions, the voltage on terminal 12 falls to that of terminal 11 thereby causing transistor T37 to saturate and so turning off transistor T36 thereby to allow transistors T9, T10 and ET1 to conduct and close the relay contacts. The voltage on terminal 12 therefore rises towards that of terminal 10 thereby turning off transistor T37 but turning on transistor T38 so that transistor T36 remains off. The circuit then assumes normal operation substantially as described.

Resistance chain 23 which forms part of the lamp failure detector circuit is represented in FIG. 2 by resistors R11, R12, R13, R14, R15 and R16. Comparator 25 is represented by transistors T12, T13, T14, T15, T16, T17 and T18 whilst comparator 26 is represented by transistors T26, T27, T28, T29, T30, T31 and T32. The voltage signal developed across resistor ER5 is applied to the two comparators by way of transistor T33 connected as a diode and it is compared by the comparators 25 and 26 with the voltage at the junction of resistors R14 and R15 and the voltage at the junction of resistors R15 and R16 respectively. The output of comparator 25 appears on the collector of transistor T15 and ignoring for the moment transistor T19, it is fed to the base of transistor T20 which is connected as an emitter follower, to the base of transistor T21. The operation of the circuit is such that transistor T21 is saturated when the indicator lamp current exceeds the lower level 32. Transistor 22 is fed in a similar fashion, by the comparator 26 and is saturated when the indicator lamp current exceeds the upper level 31. For the moment however we are considering the operation of comparator 25 and its effect upon the frequency of operation of the oscillator. The signal on the collector of transistor T21 is fed back to the junction of resistors R3 and R4 and if transistor T21 is conducting whilst the relay contacts are closed, the normal flash rate will be obtained. If however transistor T21 is not permanently saturated as previously described, whilst the relay contacts are closed, then the reference voltage applied to the comparator of the oscillator is increased and the higher flash rate is obtained.

Considering now the comparator 26. The output of this comparator appears on the collector of transistor T28 and this is fed by way of transistor T25 and T24 connected in the Darlington configuration as an emitter follower to the base of transistor T23 which effects inversion. Transistor T23 is therefore saturated when three indicator lamps are illuminated. This signal is applied to the logic circuit 27 which is comprised of transistors T39, T40, T41, T42, T43 and T44 together with resistors R33-R38 inclusive. The logic unit also receives a gate input signal from the junction of resistors R6 and R7 associated with the driving of the relay and a gating signal by way of resistor ER6 and through transistor T42. In the absence of gating signals when the collector of transistor T23 is saturated i.e. when three indicator lamps are in operation, transistors T40 and T44 are turned off thereby allowing the base and emitter of transistor T43 to rise in potential to discharge the capacitor EC2 by way of resistor R39. If one lamp fails or is disconnected, transistor 23 switches off and transistors T40 and T44 switch on. The collector voltage of transistor T44 therefore fails so that the capacitor EC2 is charged through resistor R39. The action of the gate signals allows the charging or discharging of the capacitor to occur only in the period between the relay being de-energised and the contacts opening. Whilst the relay is energised both transistors T43 and T44 are held off by the action of transistors T39 and T41. When the relay contacts 16 are open transistor T44 is held off by transistor T42 but transistor T43 will not be switched on because the comparator 26 cannot sense the presence of three indicator lamps whilst the contacts are open. The time constant of resistor R39 and capacitor EC2 is arranged to be shorter than the drop out time of the relay so that the capacitor can be fully discharged or charged in one cycle of operation.

The practical effect is therefore that the capacitor is discharged when three indicator lamps are in operation but if one of the indicator lamps fails or is disconnected, the capacitor is charged.

The signal from the capacitor is taken through the switch 28 and this comprises transistors T45, T46, T47 and T48 and output transistors T51 and T53 the latter two transistors being connected as a Darlington pair. When transistors T51 and T53 are conducting then the base of transistor ET2 is connected by way of resistor R46 to the supply line 40 and transistor ET2 conducts so that the second pilot lamp 29 is illuminated. The switch 28 presents a high impedance to the capacitor and transistor T49 which is connected as a diode, ensures that when the relay contacts 16 are opened, transistors T51 and T53 are nonconductive. Thus when the capacitor EC2 is discharged the switch when gated, will cause illumination of the second pilot lamp 29.

In the sequence of operation described above certain transistors and associated circuits have been ignored for example transistor T19 and also transistors T50, T52 and T54. These transistors are brought into operation when an alternative connection is employed. In the alternative connection the second pilot lamp is not provided so that transistor ET2 and resistor ER4 are redundant. Instead the base of transistor ET2 is connected by way of resistor ER7 to terminal 11 when a trailer is connected. Without the trailer connected only two indicator lamps are present and the action of the circuit is as described, that is to say the flash rate is substantially doubled if one of the indicator lamps fails. When the trailer is connected transistors T50 and T52 conduct and the resulting current flows to terminal 11 by way of resistor ER7 and the trailer plug connection. Transistor T19 is therefore held on so that transistors T20 and T21 are non-conductive. In this situation therefore only comparator 26 is operative and this controls the function of the oscillator. If one indicator lamp fails then the frequency of operation of the oscillator and therefore the flash rate of the remaining lamps is substantially doubled by the action of the comparator 26.

I claim:

1. A road vehicle direction indicator system for a vehicle unit, said system comprising two sets of direction indicator lamps for respective sides of the vehicle unit, a selector switch operable to select the operation of one or the other of said sets of lamps, an electromagnetic relay having a pair of contacts connected in series with said selector switch so that when the contacts are closed electric current will be supplied to the selected set of lamps, an oscillator for driving said relay, said oscillator including a capacitor, a charge/discharge circuit for the capacitor, first switch means operable to modify the operation of the charge/discharge circuit, a control input for said first switch means, a reference voltage source, second switch means operable to change the output of the reference voltage source, a control input for said second switch means, and a comparator for comparing the capacitor voltage and the reference voltage, said comparator providing a signal to control the energization of said relay when the capacitor and reference voltages at the inputs of the comparator become substantially equal, said control inputs being electrically connected to said relay contacts so that the operation of the charge/discharge circuit is modified and the output of the reference voltage source changed, only when the relay contacts change their state.

2. A system according to claim 1 in which said first and second switch means are electrically connected to a point intermediate said pair of contacts and said selector switch.

3. A system according to claim 2 in which said first and second switch means comprise a pair of transistors respectively having their bases connected through a resistor to said point.

4. A system according to claim 1 in which said charge/discharge circuit comprises a pair of series connected resistors connected to one plate of said capacitor, said first switch means comprising a transistor having its collector emitter path connected between a point intermediate said pair of resistors and one supply line, the other plate of the capacitor and the free end of one of said resistors being connected to the other supply line, the base of said transistor being connected through a further resistor to a point intermediate said pair of contacts and said selector switch.

5. A system according to claim 4 in which said reference voltage source comprises a plurality of resistors connected between said supply lines, and said second switch means comprises a further transistor having its collector emitter path connected in parallel with one of said plurality of resistors, the base of said further transistor being connected through said further resistor to said point.

6. A system according to any one of the preceding claims including a sensing resistor in series with said pair of contacts, and means responsive to the voltage developed across said sensing resistor, when the pair of contacts are closed for influencing the operation of said oscillator.

7. A system according to claim 6 in which said means comprises a further comparator which can operate to modify said reference voltage when the voltage developed across said sensing resistor falls below a predetermined value.

8. A system according to claim 5 including a sensing resistor connected in series with said pair of contacts, a further comparator responsive to the voltage developed across said sensing resistor, said comparator including an output stage operable to bridge said one and a further one of said plurality of resistors, when the voltage developed across said sensing resistor exceeds a predetermined value, whereby the oscillator will operate at a different frequency.

9. A system according to claim 8 in which said different frequency is lower.

10. A system according to claim 9 including an additional comparator responsive to the voltage developed across said sensing resistor, and a warning lamp circuit operable by said additional comparator if the voltage developed across said resistor when the indicator lamps are in operation, falls below a second predetermined value.

11. A system according to claim 10 in which said warning lamp circuit includes a switch operated by said contacts, a memory capacitor, the voltage across which is applied to a lamp control circuit through said switch when the contacts are closed, and logic means for adjusting the stored voltage on said memory capacitor during the period between de-energisation of the operating coil of the relay and the opening of the contacts, said additional comparator determining the voltage stored by the memory capacitor.

* * * * *